(12) United States Patent
Hunter

(10) Patent No.: US 10,814,409 B2
(45) Date of Patent: Oct. 27, 2020

(54) CIRCULAR HOLE CUTTING TOOL AND METHOD OF USE

(71) Applicant: Hyperloop Technologies, Inc., Los Angeles, CA (US)

(72) Inventor: Jacob Hunter, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 387 days.

(21) Appl. No.: 15/653,927

(22) Filed: Jul. 19, 2017

(65) Prior Publication Data

US 2018/0021864 A1    Jan. 25, 2018

Related U.S. Application Data

(60) Provisional application No. 62/364,570, filed on Jul. 20, 2016.

(51) Int. Cl.
| | | |
|---|---|---|
| B23K 10/00 | (2006.01) |
| B23D 33/04 | (2006.01) |
| B23K 37/00 | (2006.01) |
| B23B 51/04 | (2006.01) |
| B23Q 9/00 | (2006.01) |
| B26F 1/44 | (2006.01) |

(52) U.S. Cl.
CPC .......... *B23D 33/04* (2013.01); *B23B 51/0426* (2013.01); *B23K 37/00* (2013.01); *B23Q 9/0071* (2013.01); *B23Q 9/0057* (2013.01); *B26F 2001/4463* (2013.01)

(58) Field of Classification Search
CPC . H05H 1/34; H05H 1/26; B23D 33/04; B23Q 9/0071; B23Q 9/0057; B23B 51/0426; B26F 2001/4463; B23K 37/00

USPC .......... 219/121.39, 121.44, 121.67, 121.48, 219/121.56, 121.58
See application file for complete search history.

(56) References Cited

U.S. PATENT DOCUMENTS

| | | | |
|---|---|---|---|
| 4,158,417 A * | 6/1979 | Inoue ..................... | B23D 21/02 |
| | | | 414/412 |
| 5,452,751 A | 9/1995 | Engler, III et al. | |
| 5,758,702 A * | 6/1998 | Adams ............... | B23D 57/0076 |
| | | | 144/136.95 |
| 6,425,829 B1 | 7/2002 | Julien | |
| 8,304,684 B2 | 11/2012 | Currier et al. | |
| 9,302,353 B2 * | 4/2016 | Brandstrom ....... | B23K 37/0276 |

(Continued)

FOREIGN PATENT DOCUMENTS

| | | |
|---|---|---|
| CN | 104874894 | 9/2015 |
| KR | 10-1066264 | 9/2011 |

OTHER PUBLICATIONS

International Search Report and Written Opinion in counterpart application No. PCT/US2017/042807, dated Oct. 2, 2017.

*Primary Examiner* — Mark H Paschall
(74) *Attorney, Agent, or Firm* — Greenblum & Bernstein, P.L.C.

(57) ABSTRACT

A hole cutting apparatus for cutting a hole in a tubular structure, which includes a center shaft, a slide mount rotatably attached to the center shaft, a slide rail slidably attached to the slide mount; a cutter attachable to the slide rail so as to move with the slide rail, and a cutter height roller attached to the cutter. The cutter height roller is structured and arranged to maintain the cutter at a distance from a cutting surface of the tubular structure as the hole is cut.

14 Claims, 13 Drawing Sheets

(56) References Cited

U.S. PATENT DOCUMENTS

| | | | |
|---|---|---|---|
| 2005/0035093 A1* | 2/2005 | Yamaguchi | B23K 10/00 219/121.39 |
| 2010/0301019 A1* | 12/2010 | Vos | B23K 37/0258 219/121.39 |
| 2012/0257937 A1* | 10/2012 | Onishi | B23B 29/03489 408/1 R |
| 2013/0319063 A1 | 12/2013 | Schmid et al. | |
| 2016/0144464 A1* | 5/2016 | Zwickl | B23K 37/0408 219/121.72 |
| 2016/0264397 A1* | 9/2016 | Wagenaar | B26D 3/282 |

\* cited by examiner

CIRCULAR HOLE CUTTING TOOL AND METHOD OF USE

CROSS-REFERENCE TO RELATED APPLICATION

The present application claims the benefit of U.S. Provisional Application No. 62/364,570, filed Jul. 20, 2016, the contents of which are expressly incorporated herein by reference in their entirety.

BACKGROUND OF THE DISCLOSURE

1. Field of the Disclosure

The present disclosure relates to a circular hole cutting tool and method of operation.

2. Background of the Disclosure

A high speed, high efficiency transportation system may utilize a low pressure environment in order to reduce drag on a vehicle at high operating speeds, thus providing the dual benefit of allowing greater speed potential and lowering the energy costs associated with overcoming drag forces. These systems may use a near vacuum within a tubular structure. The scale of this project requires piping on an unprecedented scale. Therefore, many unique engineering challenges have emerged.

Cutting large diameter holes into already-fabricated pipe segments presents difficulties due to the curved geometry of the pipe. A hole used for a connection to the pipe requires a precisely positioned and controlled cut to precisely form the hole in the pipe. Performing such cuts "by hand" in an unaided manner lacks the necessary precision for creating a perfect "circular" hole.

An approach for cutting circular holes into flat plates of metals is not suitable for cutting circular holes in curved plates. For example, cutting circular holes into flat plates may involve utilizing a modified "compass," which is a tool that pivots about the center of the cut, and cuts a circle with a constant radius. While this approach may provide a circular cut in flat plates, such an approach is not suitable (and becomes problematic) when a circular cross-section on a curved surface (for example, the side of a large pipe). For example, as the cutting head follows the curvature of the surface (instead of a flat or planar surface), the radius of the two-dimensional cut varies per the three-dimensional curvature of the surface, which may lead to a cross-sectional cut shape that is distorted (e.g., not circular).

Some approaches to forming circular holes in tubular structures involve placing or arranging the pipe (or tubular structure) that is to be cut on a computer-controlled cutting machine, which forms the hole while compensating for the complex tubular geometry. This solution, however, is very expensive and is limited in its usage by the size and location of the pipe. For example, to utilize such an approach, the pipe segments themselves must be accommodateable in such a cutting machine. As such, this approach is not suitable with a larger diameter pipe (that is, for example, unaccommodateable in such a cutting device) and/or when the pipe is already placed in field conditions and/or attached to a long stretch of already placed pipe (such that the pipe, for example, cannot be moved to the cutting device). Moreover, this approach can be very expensive.

Therefore, there is a need in the art for an improved portable and low-cost hole cutting tool and method for cutting circular cross section holes in a wall of a tubular structure.

SUMMARY OF THE EMBODIMENTS OF THE DISCLOSURE

The novel features which are characteristic of the disclosure, both as to structure and method of operation thereof, together with further aims and advantages thereof, will be understood from the following description, considered in connection with the accompanying drawings, in which an embodiment of the disclosure is illustrated by way of example. It is to be expressly understood, however, that the drawings are for the purpose of illustration and description only, and they are not intended as a definition of the limits of the disclosure.

The present disclosure is related to a tool designed to be fixed to a curved surface of a work piece via a threaded shaft. An arm of the tool rotates about this centerline shaft, creating a circle with a constant radius on a plane perpendicular to the centerline. A cutting implement is attached to one side of the arm and slides freely perpendicular to the plane created by the rotating arm. A followed roller rides along the surface and, in addition to a tensioning system, keeps the cutting implement at a specified ride height relative to the surface of the work piece. These mechanisms combine to allow the tool to cut a circular cross-section in a complex 3-dimensional surface. The tool is also far less expensive than conventional approaches and offers greater flexibility and portability than a computer controlled cutting table.

Aspects of the disclosure are directed to a hole cutting apparatus for cutting a hole in a tubular structure. The hole cutting apparatus includes a center shaft, a slide mount rotatably attached to the center shaft, a slide rail slidably attached to the slide mount; a cutter attachable to the slide rail so as to move with the slide rail, and a cutter height roller attached to the cutter. The cutter height roller is structured and arranged to maintain the cutter at a distance from a cutting surface of the tubular structure as the hole is cut.

In embodiments, the slide rail is slidable in a direction parallel to the longitudinal axis of the center shaft.

In additional embodiments, the hole cutting apparatus further comprises a base plate arrangeable on the cutting surface of the tubular structure, wherein the base plate is structured and arranged to support the center shaft.

In further embodiments, the hole cutting apparatus further comprises a support cylinder fastened to the base plate wherein the support cylinder accommodates a portion of the center shaft to support the center shaft.

In yet additional embodiments, the base plate has tubular-structure contact side, and wherein the tubular-structure contact side has a curved surface approximating an outer diameter of the tubular structure.

In embodiments, the hole cutting apparatus further comprises a diameter adjustment coupler pivotably attached around the center shaft, a diameter adjustment bar adjustably fastenable to the diameter adjustment coupler so as to set a radius of the hole, and a slide base attached to a distal end of the diameter adjustment bar and structured and arranged to securely fasten the slide mount thereto.

In additional embodiments, the hole cutting apparatus further comprises an extension bar attached to an end of the diameter adjustment bar opposite the slide base, and structured and arranged to provide a handle for actuating manual rotation of the diameter adjustment bar around the center shaft.

In further embodiments, the hole cutting apparatus further comprises at least one tensioning spring connected between the slide mount and the slide rail so as to bias the slide rail towards the cutting surface In some embodiments, the cutter is a plasma cutter.

In embodiments, the hole cutting apparatus further comprises a motor, a sprocket attached to rotate with the slide mount, and a chain attached between the motor and the sprocket, wherein the motor is structured and arranged to provide a rotational force to rotate the slide mount about the center shaft.

In additional embodiments, the hole cutting apparatus further comprises a plurality of couplers attached to the slide rail and structured and arranged to securely accommodate the cutter therein, so as to releasably fasten the cutter to the slide rail.

In further embodiments, the hole cutting apparatus further comprises a lower flange insertable into lower side of the diameter adjustment coupler, an upper flange insertable into lower side of the diameter adjustment coupler, wherein the center shaft passes through the lower flange, the diameter adjustment coupler, and the upper flange.

In yet additional embodiments, the central shaft has a first threaded end and a second threaded end, and wherein the first threaded end is configured for threaded engagement with a center point hole formed in the tubular structure.

In embodiments, the hole cutting apparatus further comprises a nut structured and arranged for threaded engagement with the second threaded end of the central shaft, wherein the nut secures a diameter adjustment coupler arranged on the central shaft.

Additional aspects of the present disclosure are directed to a method for cutting a hole in a tubular structure. The method comprises attaching the hole cutting tool to the tubular structure, activating the cutter, rotating the cutter about the center shaft to cut the tubular structure to form the hole, and maintaining the cutter at the distance from a cutting surface of the tubular structure with the cutter height roller as the hole is cut.

Additional aspects of the present disclosure are directed to a method for cutting a hole in a tubular structure. The method comprises attaching a center shaft to the tubular structure, rotatably attaching a slide mount to the center shaft, slidably attaching a slide rail to the slide mount, attaching a cutter to the slide rail so as to move with the slide rail, attaching a cutter height roller to the cutter, rotating the cutter about the center shaft to cut the hole, and maintaining the cutter at a distance from a cutting surface of the tubular structure with the cutter height roller as the hole is cut.

In embodiments, the method further comprises utilizing at least one tensioning spring connected between the slide mount and the slide rail to bias the slide rail towards the cutting surface.

In additional embodiments, the method further comprises pivotably attaching a diameter adjustment coupler around the center shaft, sliding a diameter adjustment bar in the diameter adjustment coupler so as to set a radius of the hole, and fastening the diameter adjustment bar in the diameter adjustment coupler at the set radius of the hole.

In further embodiments, the cutter is a plasma cutter.

In yet additional embodiments, the rotating the cutter comprises actuating a motor to provide a rotational force to rotate the cutter.

By implementing aspects of the disclosure, a user-friendly portable tool is provided for cutting circular cross section holes in non-planar surfaces. By implementing aspects of the disclosure, a hole may be formed having an essentially perfect circular cross sectional shape, which allows for precise connection of pipes (or conduits), e.g., smaller pipes, such as for electrical, communication and/or control wiring or cable, and/or one or more access ports. Additionally, as the tool is portable (or field deployable), such holes may be formed in the tubular structure on site (or in the field). That is, implementing aspects of the disclosure, allows such holes to be formed without a need for arranging the entire tubular structure in a cutting machine. As such, the costs for forming such holes can be reduced.

In accordance with aspects of the disclosure, using such a tool (and assuming the axis of the formed hole is perpendicular to the longitudinal axis of the tubular structure, which is not always the case), the pitch, roll, and yaw are controlled with a single point.

BRIEF DESCRIPTION OF THE DRAWINGS

These and other features of this disclosure will be best understood by reference to the following detailed description of a preferred embodiment of the disclosure, taken in conjunction with the accompanying drawings, in which.

DETAILED DESCRIPTION OF THE EMBODIMENTS OF THE DISCLOSURE

Figure 1:
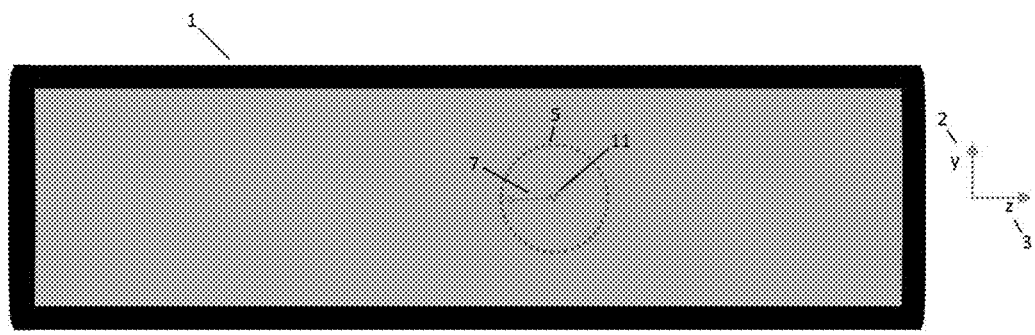
FIG. 1 shows a cross-section of a flat surface and dimensions for a hole to be cut into the flat surface in accordance with aspects of the disclosure.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt may be made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, as used herein, the indefinite article "a" indicates one as well as more than one and does not necessarily limit its referent noun to the singular. Thus, for example, reference to "a magnetic material" would also indicate that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of 5% of the indicated value.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 50 from mathematically exact perpendicular alignment.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of," so that for instance "a composition comprising a compound A" may also (essentially) consist of the compound A.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B."

The various embodiments disclosed herein can be used separately and in various combinations unless specifically stated to the contrary.

Embodiments of the present disclosure may be used in a transportation system, for example, as described in commonly-assigned application Ser. No. 15/007,783, entitled "Transportation System," the contents of which are hereby expressly incorporated by reference herein in their entirety.

In embodiments, the tubular structure (or pipes) may include connections (e.g., branch connections) to one or more pipes (or conduits), e.g., smaller pipes, such as for electrical, communication and/or control wiring or cable. Additionally, the tubular structure may include one or more access ports formed in a wall thereof. In embodiments, the connections or conduits (e.g., the smaller pipes) are circular in cross-section, and the access ports are circular in cross-section. Thus, for such branch connections and/or access ports, holes having a circular cross sectional shape are formed in the tubular structure (or pipes).

As noted, cutting large diameter holes into already-fabricated pipe segments presents difficulties, for example, due to the curved geometry of the pipe. A connection to the large diameter pipe requires a precisely positioned and controlled cut to form the desired hole in the pipe.

FIG. 1 shows a first cross-sectional view of a flat structure 1. The first cross-sectional view lies in a plane defined by a y-axis 2 and a z-axis 3. To create a hole 5 in the flat structure 1, a compass-like structure (not shown in FIG. 1) can be attached to the flat structure 1 at a desired hole center-point (HCP) 11. The user then may attach a cutter (e.g., a plasma cutter (PC)) 117 (not shown in FIG. 1) to an end of the compass-like structure opposite the HCP 11 and rotates the PC 117 about the HCP 11. As shown in FIG. 1, the PC 117 is operable to cut a hole 5, with a first radius 7, in flat structure 1.

Figure 2:
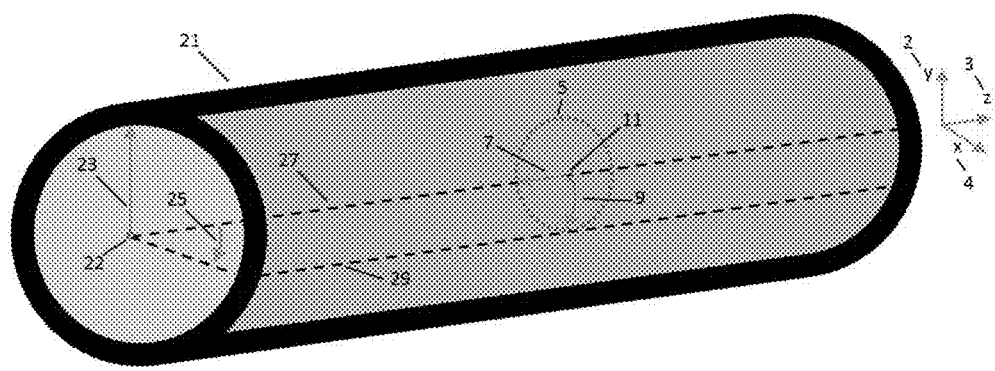
FIG. 2 shows an isometric view of a tubular structure and dimensions for a hole to be cut in the tubular structure in accordance with aspects of the disclosure.

FIG. 2 shows an isometric view of a tubular structure 21 in accordance with aspects of the disclosure. Unlike the planar flat structure 1 of FIG. 1, due to the non-planar (or non-flat) surface of the tubular structure, the tubular structure 21 surface to be cut lies in three planes (instead of one, as is the case with flat structure 1). Therefore, as shown in FIG. 2, cutting the hole 5 in planes parallel to the y-z plane requires removing material in an x direction as well. Since the tubular structure 21 curves in the x and y directions, in order to form a hole having a circular cross section, such curvature must be taken into account when cutting the hole.

As shown in FIG. 2, on the tubular structure 21, $R_1$ 7 is parallel to the z-axis 3 and lies along a flat surface of the tubular structure 21. A second radius, $R_2$ 9, marks the radius of the hole 5 along a curve of the tubular structure 21 that is parallel to the x-y plane. The HCP 11 lies on a first transverse line (FTL) 27 that is an extension of $R_1$ 7. A second transverse line (STL) 29, is parallel to the FTL 27 and intersects with the end point of $R_2$ 9. A central angle, $\theta$ 25, is the angle between the FTL 27 and the STL 29 as measured from a center-point (CP) 22 of the tubular structure 21. A tube radius (TR) 23 of the tubular structure 21 represents the magnitude of the distance between the CP 22 and the surface of the tubular structure 21.

Due to the 3-dimensional characteristics of the tubular structure 21, $R_1$ 7 and $R_2$ 9 each have three vector components. However, since $R_1$ 7 lies parallel to the z-axis, the x- and y-components of $R_1$ 7 are equal to zero and the z-component of $R_1$ 7 is equal to the magnitude of $R_1$ 7. Additionally, since $R_2$ 9 lies in the x-y plane, the z component of $R_2$ 9 is equal to 0. To create a perfect circular hole in the y-z plane, therefore, the z-component of $R_1$ 7 has to equal the y-component, $R_{2y}$ 31, of $R_2$ 9 (See FIG. 3).

Figure 3:
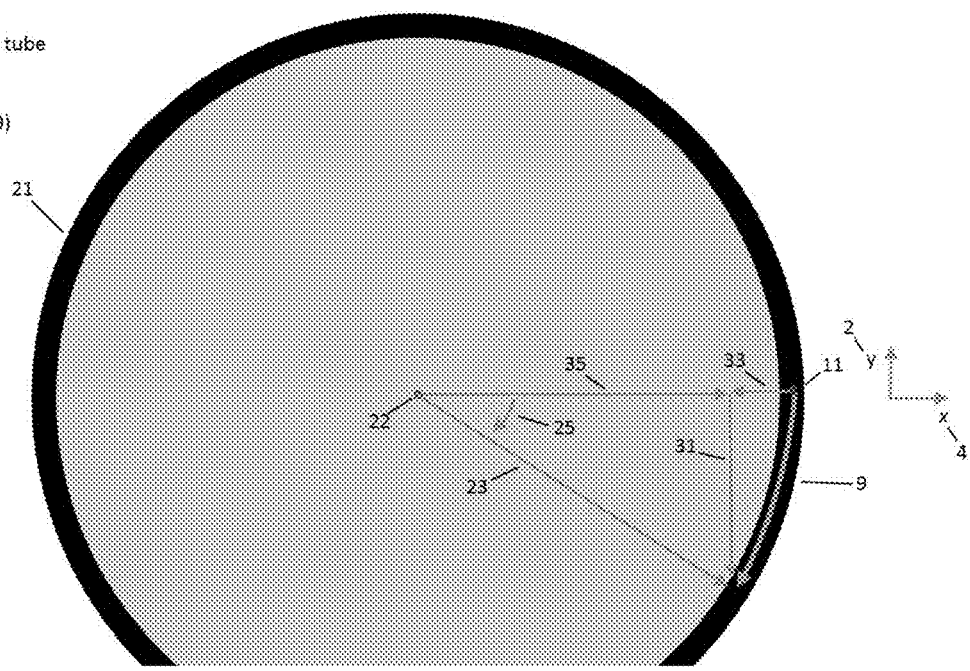
FIG. 3 shows a cross-section of the tubular structure in accordance with aspects of the disclosure.

FIG. 3 shows an x-y cross-sectional view of the tubular structure 21. As discussed above, the z-component of $R_1$ 7 and the y-component $R_{2y}$ 31 (which are the radii of the y-z cross-section of the hole 5) are driving factors when cutting the hole 5 in the tubular structure 21. It can also be observed from FIG. 3 that as $R_{2y}$ 31 increases in magnitude, $R_2$ 9, $R_{2x}$ 33 (the x component of $R_2$ 9), and $\theta$ 25 also increase in magnitude. As shown in FIG. 3, a cut displacement radius (CDR) 35 is equal to the difference between the magnitude of the TR 23 and $R_{2x}$ 33.

Figure 4:
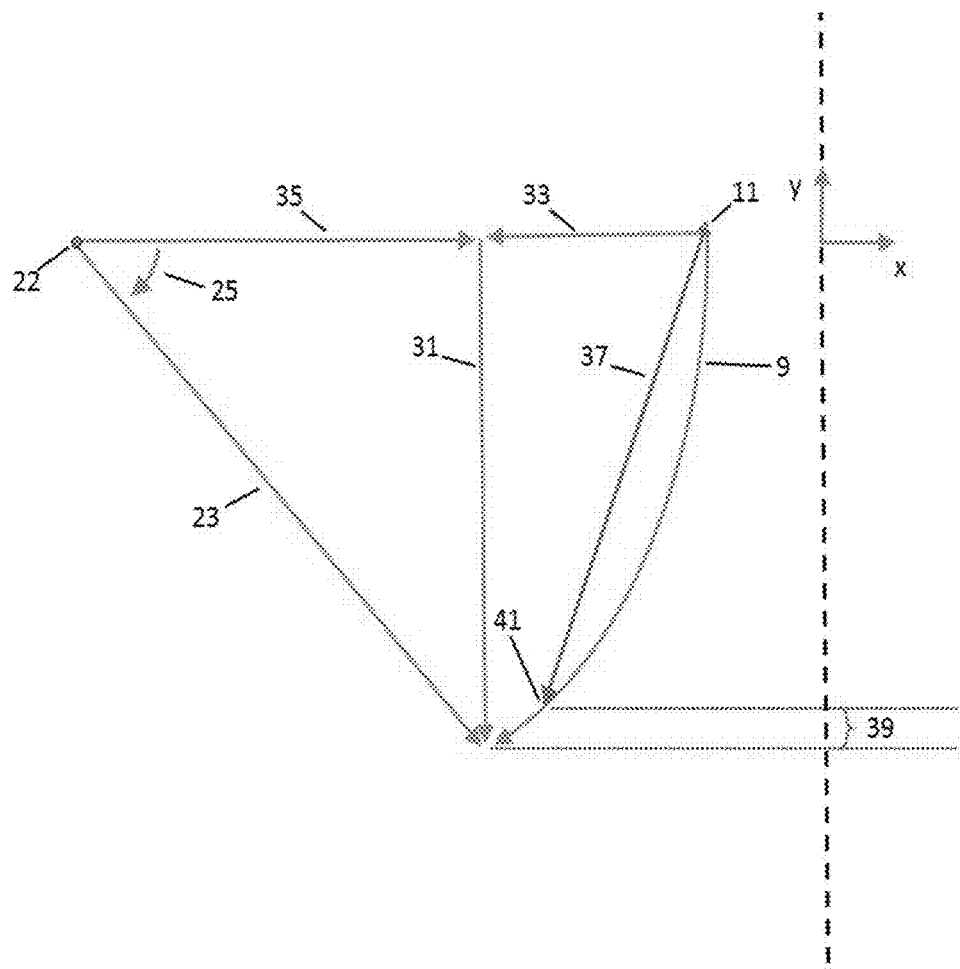
FIG. 4 shows a resulting error in the shape of the hole to be cut due to the cutting method used.

As noted above, while a compass-like structure may be suitable for forming a hole in a flat (or planar) surface), FIG. 4 shows how using a compass-like structure 37 to cut the hole 5 in the tubular structure 21 creates an error in the y direction, $E_y$ 39, leading to a misshapen hole 5 (that is not circular in the y-z plane). As shown in FIG. 4, the compass-like structure 37 is attached to the surface of the tubular structure 21 at the hole center point (HCP) 11. The scalar length of the compass-like structure 37 is equal to the magnitude of $R_1$ 7 (see FIG. 2). The PC 117 (not shown in FIG. 4) may be attached to the compass-like structure 37 at the compass-like structure end point 41.

The compass-like structure 37 may be initially oriented parallel to $R_1$ 7. In this orientation, the compass-like structure EP 41 is only displaced in the z direction, relative to the HCP 11. As the compass-like structure 37 rotates about the HCP 11, the compass-like structure EP 41 tracks along the surface of the tubular structure 21 and ultimately reaches the plane that that $R_2$ 9 lies in. In that location, as shown in FIG. 4, the compass-like structure EP 41 is displaced in the x and y directions. As such, as shown in FIG. 4, the magnitude of the compass-like structure 37 in the y direction is less than $R_{2y}$ 31. As shown in FIG. 4, the error, $E_y$ 39 is equal to the difference between $R_{2y}$ 31 and the magnitude of the compass-like structure 37 in the y direction. As should be understood, the greater the radius of the hole 5 and/or the greater the tube radius TR 23, results in the error $E_y$ 39 being greater.

Figure 5:
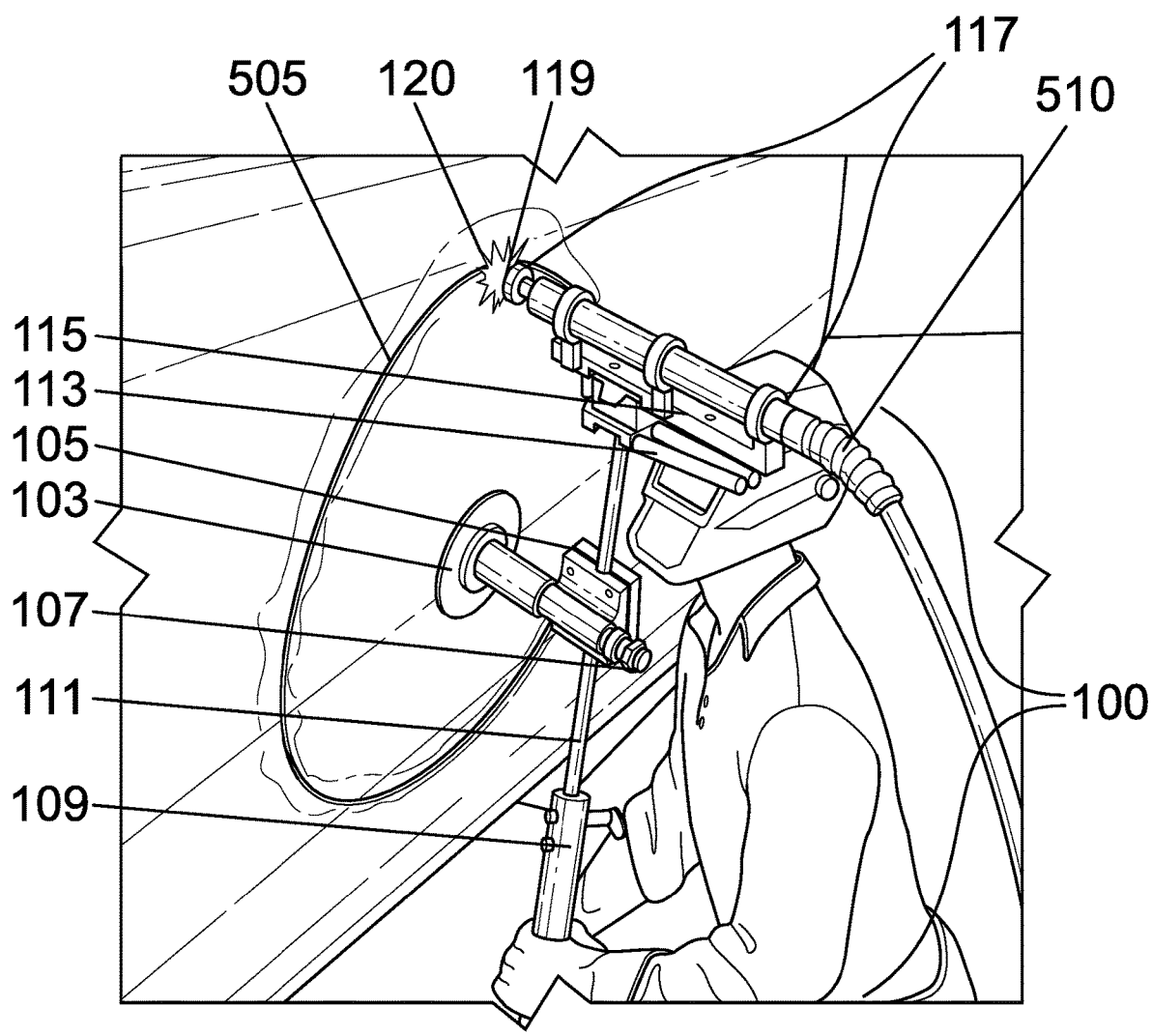
FIG. 5 shows an exemplary apparatus for cutting a hole in a tubular structure in accordance with aspects of the disclosure.

FIG. 5 shows an exemplary and non-limiting Circular Hole Cutting Tool (CHCT) 100 that can be used to form holes in a tubular structure while minimizing (or eliminating) $E_y$ 39 in accordance with aspects of the disclosure. As shown in FIG. 5, the CHCT 100 comprises a curved baseplate 103, a diameter adjustment coupler 105, a threaded shaft 107, an optional extension bar 109, a diameter adjustment bar 111, a plurality of tensioning springs (comprising of at least a first tensioning spring 113), a slide rail 115, a tube cutter (e.g., a plasma cutter PC) 117, and a cutter height roller 119.

Figure 8:
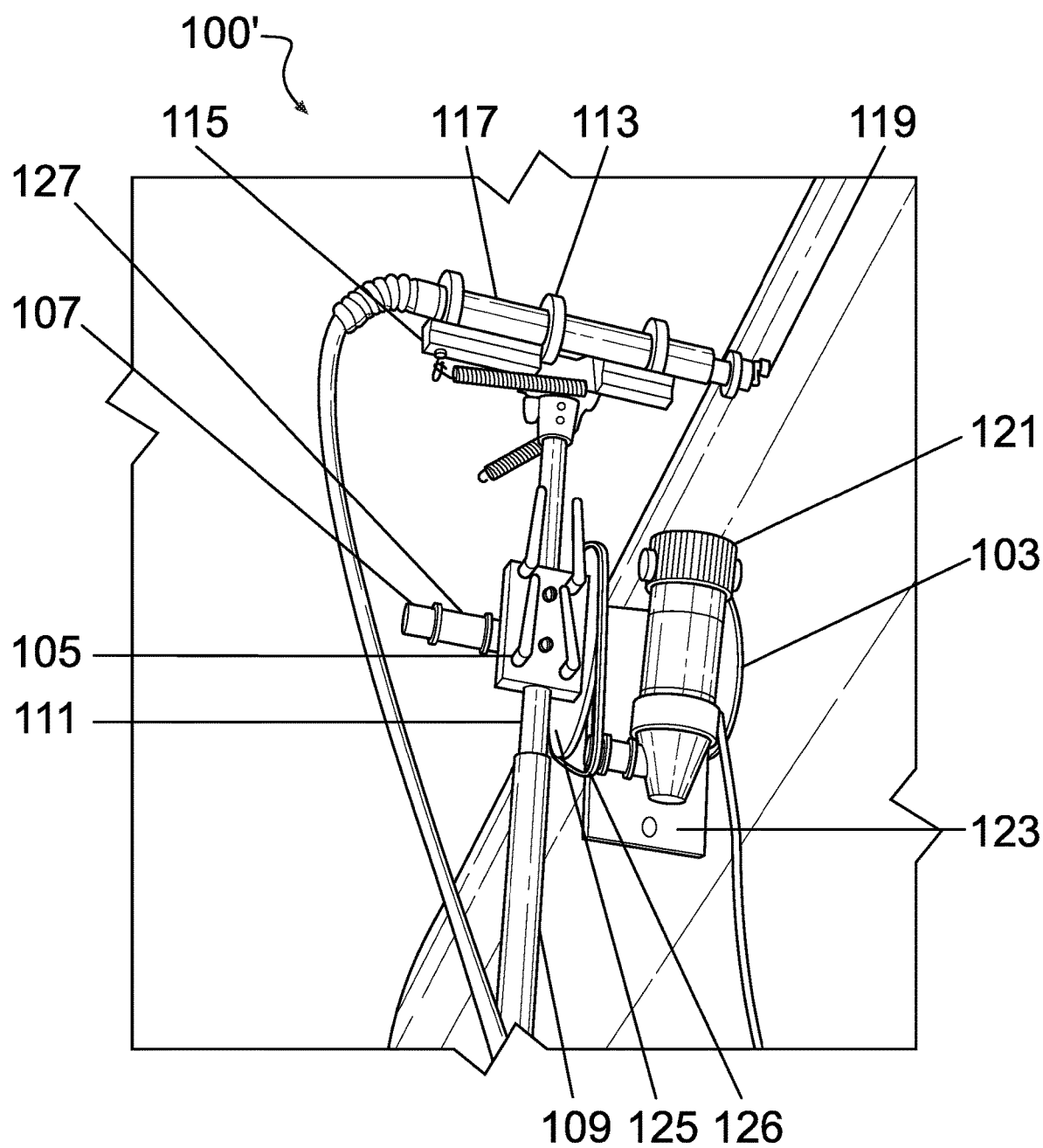
FIG. 8 shows an exemplary motorized CHCT apparatus in accordance with aspects of the disclosure.

As shown in FIG. 5, the CHCT 100 is attachable to the surface of the tubular structure 21 by coupling the curved baseplate 103 to the tubular structure at the desired HCP 11. In embodiments, the curved baseplate may be coupled to the tube structure via welding, adhesives, and/or fasteners. As should be understood, the curved baseplate 103 (or at least the bottom surface thereof) may be curved so as to match (or approximate) the curvature of the outer surface of the tube structure 1 (as shown in FIG. 8).

The HCP 11 is arranged perpendicular to the tubular structure 21 centerline. In other words, in most embodiments, the HCP 11 and the longitudinal axis of shaft 107 may be radially arranged (i.e., along a radius of the tube structure 21), such that the axis is normal (or perpendicular) to the surface of the tubular structure. With such an arrangement, the formed hole will be perpendicular to the longitudinal axis of the tubular structure 21. As discussed below, however, in some contemplated embodiments, the CHCT 100 is attachable to the surface of the tubular structure 21 in a non-normal (or non-perpendicular) arrangement. With such an arrangement, the formed hole (having a circular cross section along the axis of the hole) will not be perpendicular to the longitudinal axis of the tubular structure 21.

Figure 6:
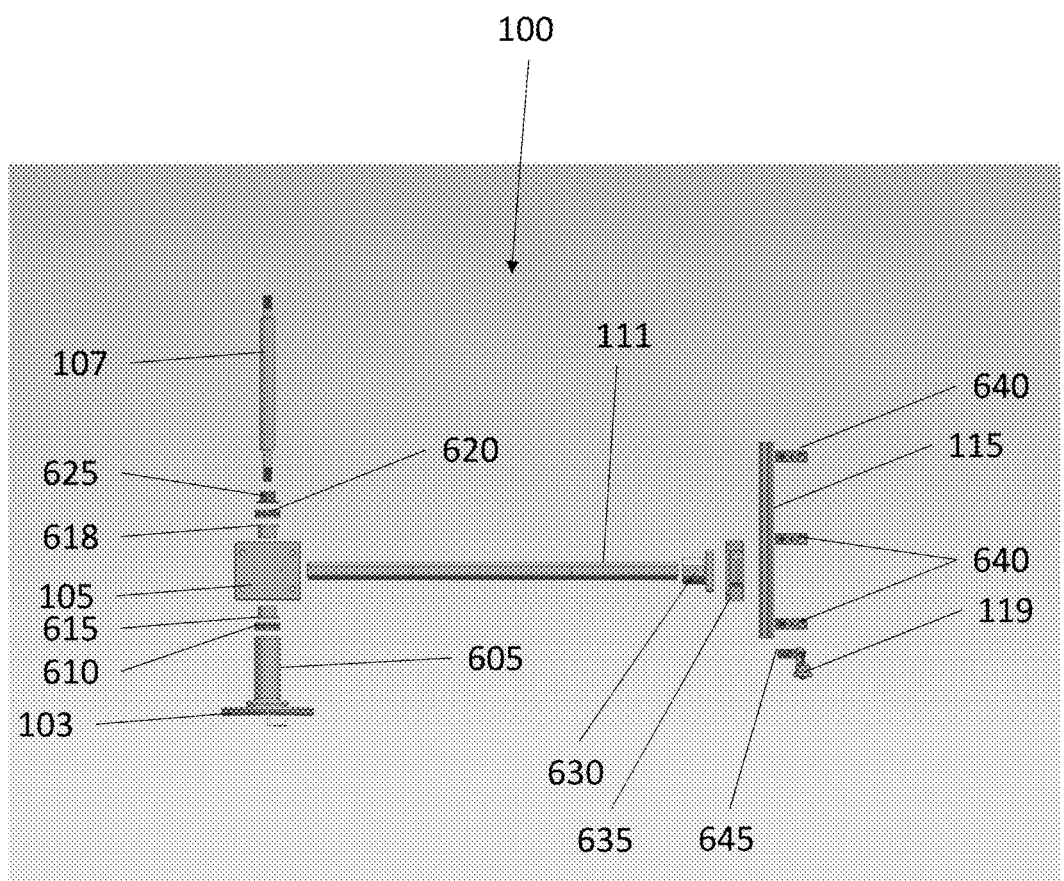
FIG. 6 shows an exemplary exploded plan view of elements of the CHCT in accordance with aspects of the disclosure.
Figure 7:
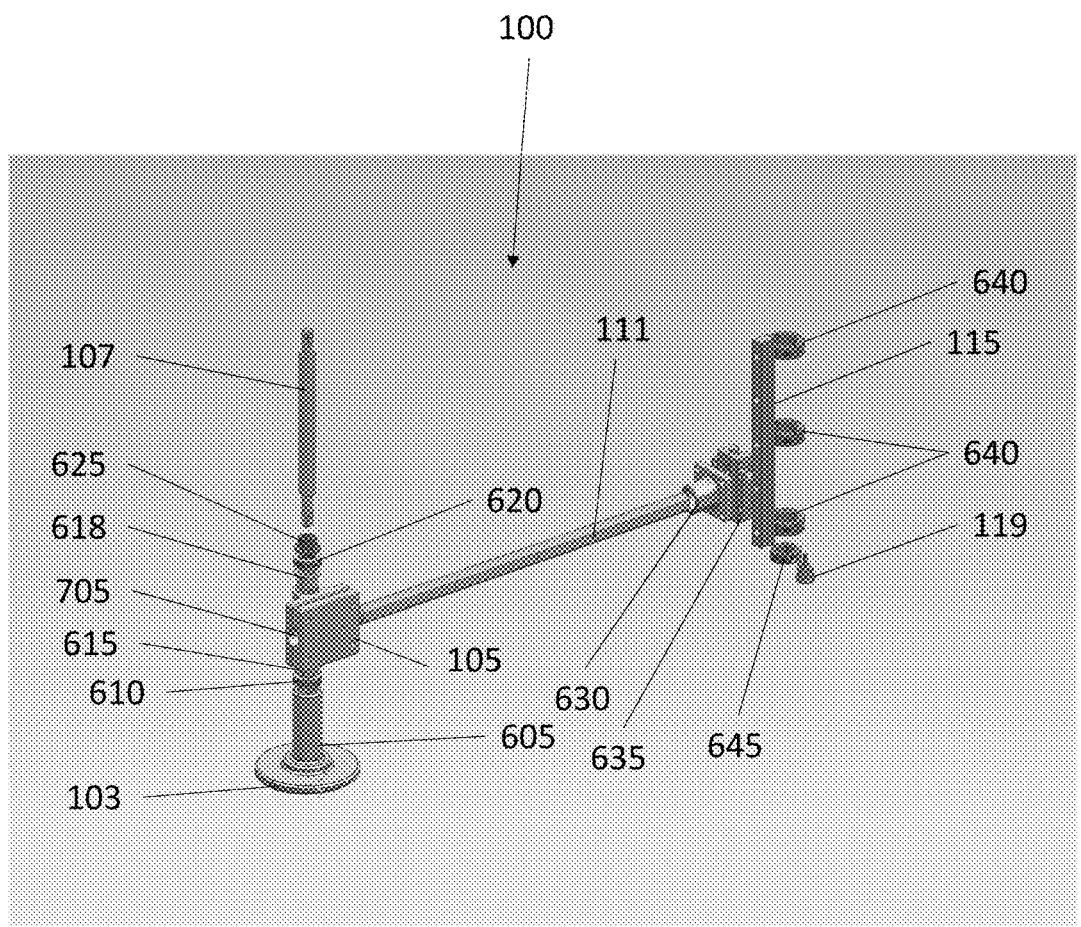
FIG. 7 shows an exemplary perspective view of the of elements of the CHCT in accordance with aspects of the disclosure.

FIG. 6 shows an exemplary exploded plan view of elements of the CHCT 100 and FIG. 7 shows an exemplary perspective view of the of elements of the CHCT 100 in accordance with aspects of the disclosure. With an exemplary and non-limiting embodiment, the CHCT 100 may first be attached to the tubular structure 21. In embodiments, attaching the CHCT 100 to the tubular structure may include attaching the curved base plate 103 to the tubular structure (not shown). The circular base plate 103 includes a support cylinder 605 structured and arranged for receiving one end of the threaded shaft 107. In accordance with aspects of the disclosure, the threaded shaft 107 is threaded into the support cylinder 605. A lower bearing 610 and a lower flange 615 are arranged on the threaded shaft 107, and the diameter adjustment coupler 105 is arranged on the threaded shaft 107 such that a portion of the lower flange 615 is accommodated within the diameter adjustment coupler 105. An upper flange 618 and upper bearing 620 are arranged on the threaded shaft 107, wherein a portion of the upper flange 618 likewise accommodated within the diameter adjustment coupler 105. A nut 625 is threadedly attached the a second end of the threaded shaft 107 to retain the threaded shaft 107 in place and to retain the lower bearing 610, a lower flange 615, diameter adjustment coupler 105, upper flange 618, and upper bearing 620. The diameter adjustment bar 111 is accommodated within a receiving hole (not shown) of the diameter adjustment coupler 105 so as to be arranged approximately perpendicular to the threaded shaft 107. The diameter adjustment bar 111 may be secured in the diameter adjustment coupler 105 using on or more threaded fasteners (e.g., set screws or grub screws).

In other contemplated embodiments, the threaded shaft 107 itself may be threaded into a hole drilled into the tubular structure 21. For example, in embodiments, a laser, for example, may be used to project a hole center point (HCP) on the tubular structure 21, and a relatively small hole (not shown) may be drilled in the tubular structure 21. This small hole may then be tapped to form threads therein, and the threaded shaft 107 may be threadedly connected to the small hole. With this exemplary embodiment, the curved baseplate 103 may be arranged over the threaded shaft 107 so as to be in contact with the tubular structure. With such an embodiment, the threaded shaft 107 may not threadedly engage with the curved baseplate 103 and/or the support cylinder 605.

In further contemplated embodiments, for example, when the tubular structure wall thickness is relatively thin, such that it alone is not sufficient to support the CHCT 100, a back plate may be arranged on a corresponding inside surface of the tube to further support the CHCT 100. For example, in embodiments the threaded shaft 107 may be structured and arranged to also threadedly engage with the back plate (and a fastening nut) to prevent (or reduce) any torque due to the weight of the CHCT 100 from deforming the tubular structure.

With reference again to FIG. 5, next, the diameter adjustment bar 111 may be adjusted (e.g., with fasteners) so that the cutter 117 (attachable to the end of the diameter adjustment bar 111) will cut a hole with a desired radius (or diameter). Once the operator 510 ensures that the diameter adjustment bar 111 is in the proper position, the torch slide rail 115, the first tensioning spring 113, and the cutter (e.g., plasma cutter) 117 may be attached to the CHCT 100.

As shown in FIGS. 6 and 7, the other end of the diameter adjustment bar 111 (i.e., opposite the end connected to the diameter adjustment coupler 105), is attached to a slide base 630 (e.g., with fasteners, welds, and/or adhesives). A slide mount 635 is attached to the slide base 630. The slide mount 635 is structured and arranged to accommodate the slide rail 115 therein, so that the slide rail 115 is slideable (in an up and down direction as depicted in FIG. 6) in the slide mount 635. While not shown in FIG. 6, one or more springs are mountable between the slide mount 635 and the slide rail 115 to bias the slide rail towards the to-be-cut surface. For example, one or more springs may be connected between the upper end of the slide mount 635 and the upper end of the slide rail 115 (as depicted in FIG. 6), such that upward movement of the slide rail 115 is countered by the one or more springs, so as to maintain the cutter height roller 119 in contact with the to-be-cut surface (so as to maintain the cutter (not shown) at the appropriate height from the to-be-cut surface for proper cutting).

As further shown in FIGS. 6 and 7, the CHCT 100 also includes one or more cutter holders 640 attached (e.g., using fasteners, welding, and/or adhesives) to the slide rail 115. The cutter holders 640 are structured and arranged to securely retain a cutter, e.g., a plasma cutter, on the slide rail. In one exemplary embodiment the cutter holders 640 may include circular clamps that are fastenable around the cutter to retain the cutter to the slide rail. As shown in FIG. 6, the cutter height roller 119 is also fastenable to the cutter using a similar clamp structure 645 attached to the cutter height roller 119. While not shown in FIGS. 6 and 7, a cutter is attached to the slide rail 115 using the cutter holders 640, and the cutter height roller 119 is attached to cutter using the clamp structure 645 of the cutter height roller 119.

Referring again to FIG. 5, the cutter 117 is slid along the torch slide rail 115 until the torch height roller 119, which is attached to the end of the cutter 117, contacts the surface of the tubular structure 21. As noted above, the torch height roller 119 and the first tensioning spring 113 are used to maintain a proper torch height 120 between the cutter 117 and the surface of the tubular structure 21. For example, the first tensioning spring 113 creates a force that pulls (or pushes) the cutter 117 towards the surface of the tubular structure 21. The torch height roller 119, when contacting the surface of the tubular structure 21, applies an opposing force to the first tensioning spring 113. In accordance with aspects of the disclosure, the operator 510 may adjust the torch height roller 119 to set a proper torch height 120.

In accordance with aspects of the disclosure, as the CHCT 100 swings about a full 360*, in those regions of the tubular structure 21 where the surface is not in the same plane as the center point, the torch height roller 119 is operable to maintain contact (e.g., rolling contact) with the tubular structure, and the cutter 117 is operable slide along with the torch slide rail 115 in the slide support 635 (e.g., towards the surface of the tubular structure) so as to maintain the cutter 117 at the proper position (e.g., radially and height above the surface) for forming the circular hole.

Once a torch height 120 believed to be proper is obtained, the operator 510 may swing the CHCT 100 in a full circle to ensure the torch height 120 is proper. That is, the operator confirms that, as CHCT 100 is swung in a full circle, the cutter 117 is operable to slide on the torch slide rail 115 within a range such that the cutter 117, in conjunction with the first tensioning spring 113 and the cutter (e.g., torch) height roller 119, maintains a proper distance from the tubular structure 21. If proper torch height 120 is confirmed, the operator may begin cutting the hole 5. For example, the operator 510 may activate the cutter (e.g., plasma cutter) and then manually rotate the cutter 117 around the threaded shaft 107 at a desired rate so as to form a cut 505 in the tubular structure 21 so as to form the hole. In embodiments, in accordance with aspects of the disclosure, a user 510 may grip the opposite end of the diameter adjustment bar 111 or the optional extension bar 109 to manually rotate the cutter 117 around the shaft 107. In embodiments, the cutter is a plasma cutter operable to produce a plasma beam of 1/8" diameter, which is sufficient to remove tube materials (or form the cut 505) to form the hole.

FIG. 8 shows another exemplary CHCT 100' in accordance with aspects of the disclosure. As shown in FIG. 8, CHCT 100' further comprises a motor 121, a motor mount 123, a chain 125, a sprocket 126, and an extended shaft 127. In contrast to CHCT 100, which is configured for manual rotation, CHCT 100' is configured for motorized rotation. In accordance with aspects of the disclosure, the motor mount 123 is attachable to a portion of the CHCT 100' and provides a secure mount for the motor 121. As shown in FIG. 8, the motor 121 is mounted to the motor mount 123 and is further attached to the chain 125, which engages the sprocket 126. The sprocket 126 is connected to the diameter adjustment bar 111, such that these elements rotate together. Thus, as the motor 121 rotates, the motor 121 moves the chain 125, the chain 125 in turn rotates the sprocket 126, and the sprocket 126 rotates the diameter adjustment bar 111 and cutter 117 attached thereto. In embodiments, the operator can alter the speed of the motor 121 to provide an adjustable speed of travel for the cutter 117.

The rate of travel of the cutter may depends on the type of cutter, the magnitude of the cutter "blade" (e.g., plasma beam strength and/or diameter), and/or the type and/or thickness of tubular structure materials. When utilizing a motor to rotate the cutter, the motor may have a variable potentiometer, wherein current supplied to the motor controls the rate of rotation. In embodiments, available recommendations based on material and material thickness may be utilized to determine (e.g., calculate) rate of rotation. It should also be noted that the cutter (e.g., plasma torch) may not be operating optimally (e.g., may be below optimum or above optimum), and as such, in some instances the rate of rotation may need to be adjusted (e.g., slowed or quickened), e.g., in real-time, in order to achieve the desired cut. As an operator is either manually moving the CHCT 100 or moving the CHCT via the motor, the operator can observe the cut being formed in real-time, and can make the necessary adjustments.

By utilizing the motorized rotation, CHCT 100' may cut the holes in a more controlled and consistent manner, e.g., by utilizing a standard rate of rotation. Additionally, utilizing the motorized rotation, CHCT 100' may be configured for producing cuts in different material thicknesses. For example, if a tubular structure has a thicker wall, the rate of rotation (as controlled by the speed of the motor) of the cutter may be reduced, so that the cutter can penetrate the thicker wall material.

Figure 9:
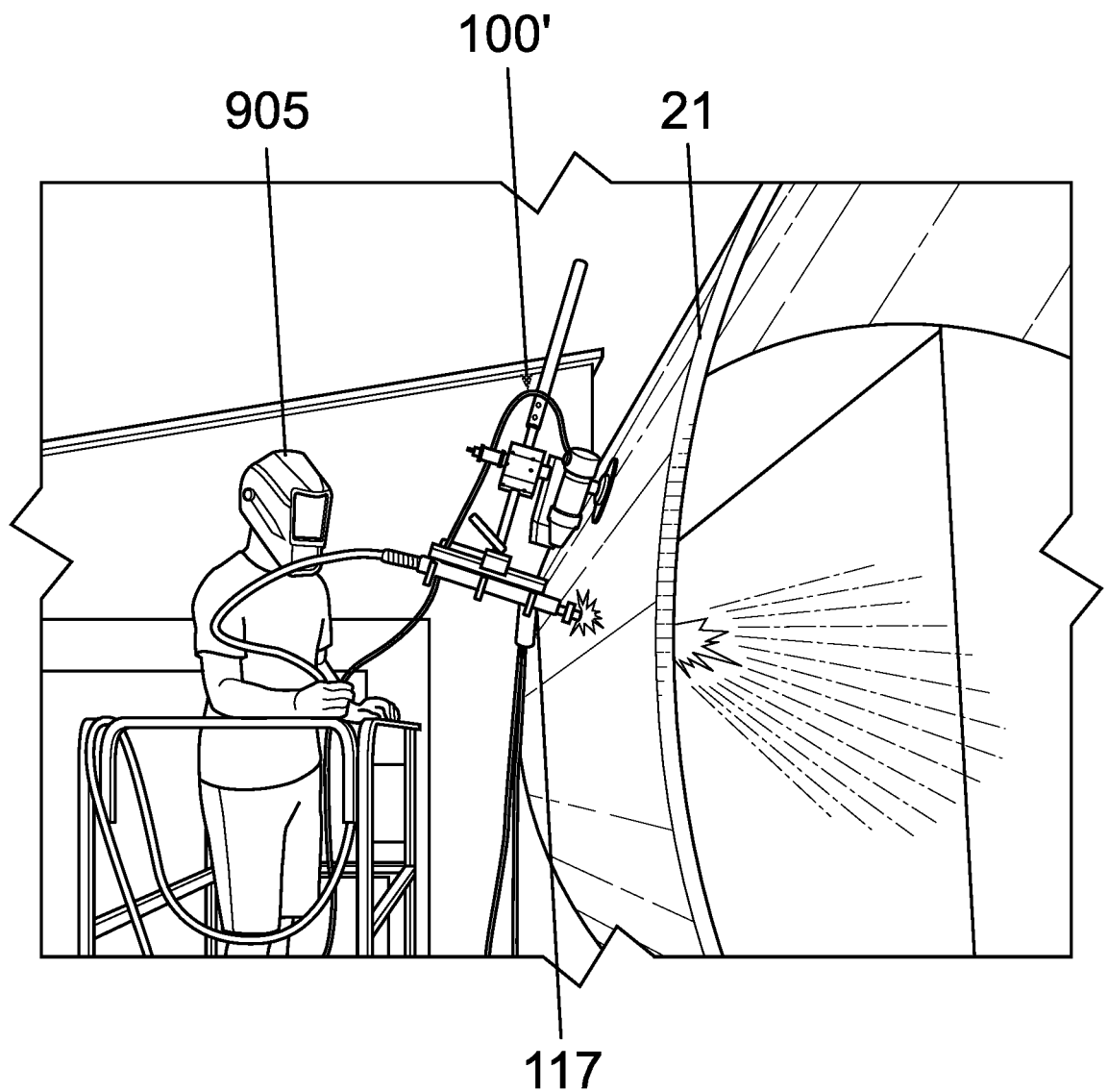
FIG. 9 shows the CHCT with a plasma cutter being used to form a hole in the tubular structure in accordance with aspects of the disclosure.

FIG. 9 shows the CHCT 100' with a plasma cutter being used to form a hole in the tubular structure 21 in accordance with aspects of the disclosure. As shown in FIG. 9, the cutter 117 is a plasma cutter, and an operator 905 is present to control operation of the motor to control the rotation (and the rate of rotation) and to control activation/deactivation of the plasma cutter.

Figure 10:
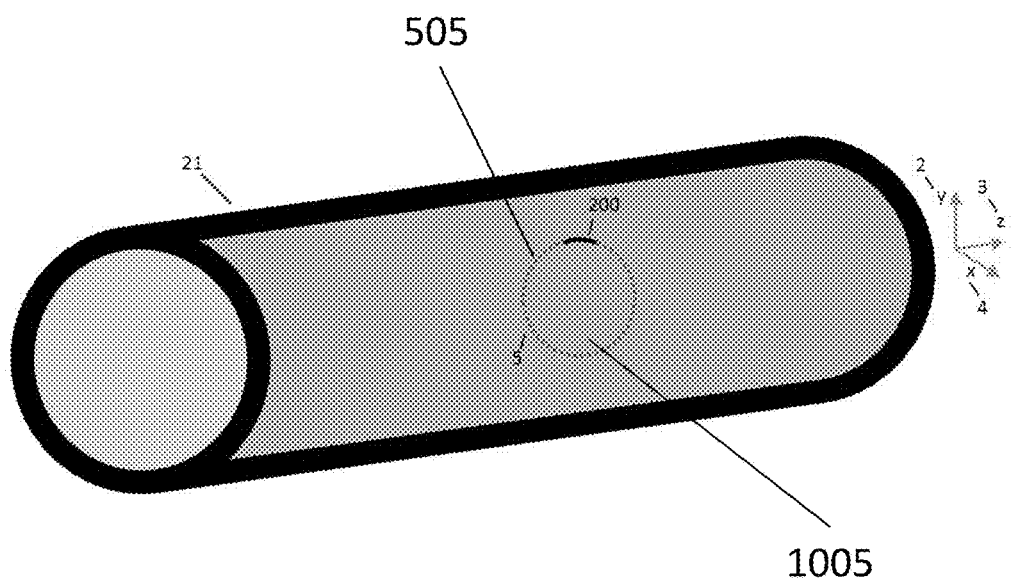
FIGS. 10 and 11 shows cuts to ensure safe operation of the apparatus motorized in accordance with aspects of the disclosure.

FIG. 10 shows aspects of a method for cutting the hole 5 in a side of the tubular structure 21 in accordance with aspects of the disclosure. Once the CHCT and cutter (not shown) are properly set-up as discussed herein, the cutter may be rotated (e.g., manually or using a motor) so that the cutter is operable to cut the hole into the tubular structure 21. In accordance with aspects of the disclosure, in order to secure a safe removal of the CHCT and the hole material 1005 removed from the tubular structure 21, the operator may leave an un-cut side tab 200 of predetermined length at the top of the (yet-to-be completed) hole 5. In embodiments, the circumferential length of the un-cut side tab 200 may be approximately ½", with other lengths contemplated. The operator then disengages the CHCT from its connection to the tubular structure at the hole center point (not shown). The side tab 200 may then be cut by (e.g., by hand) and the hole material 1005 can be removed safely.

Figure 11:
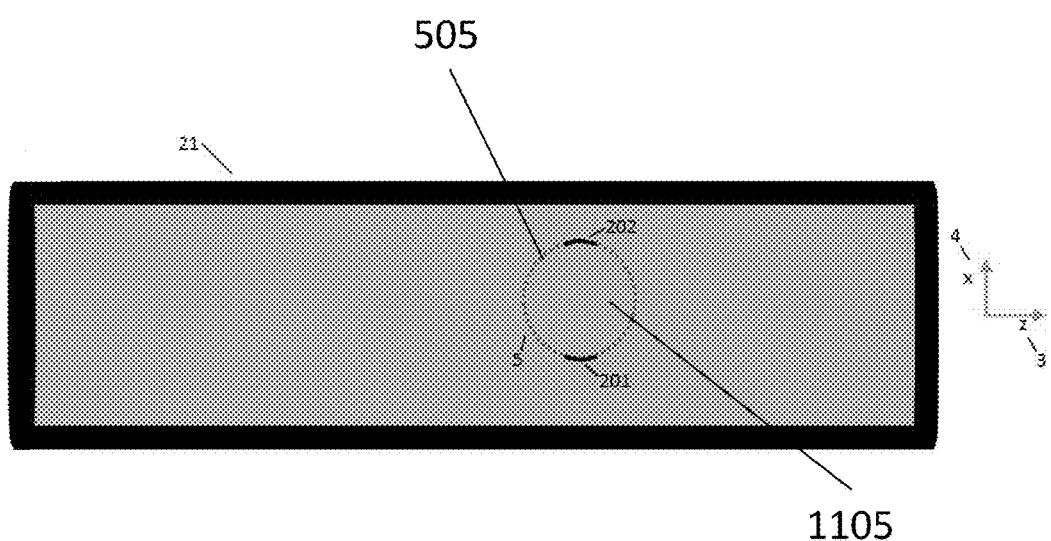
Figure 12A:
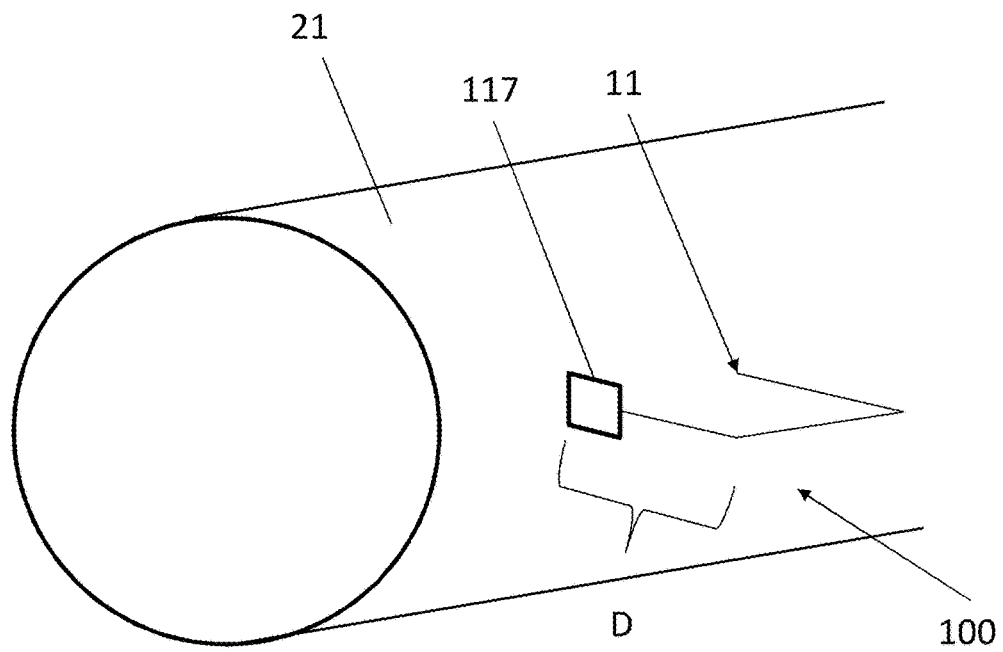
FIGS. 12A-12D schematically depict operation of the Circular Hole Cutting Tool (CHCT) in accordance with aspects of the disclosure.
Figure 12B:
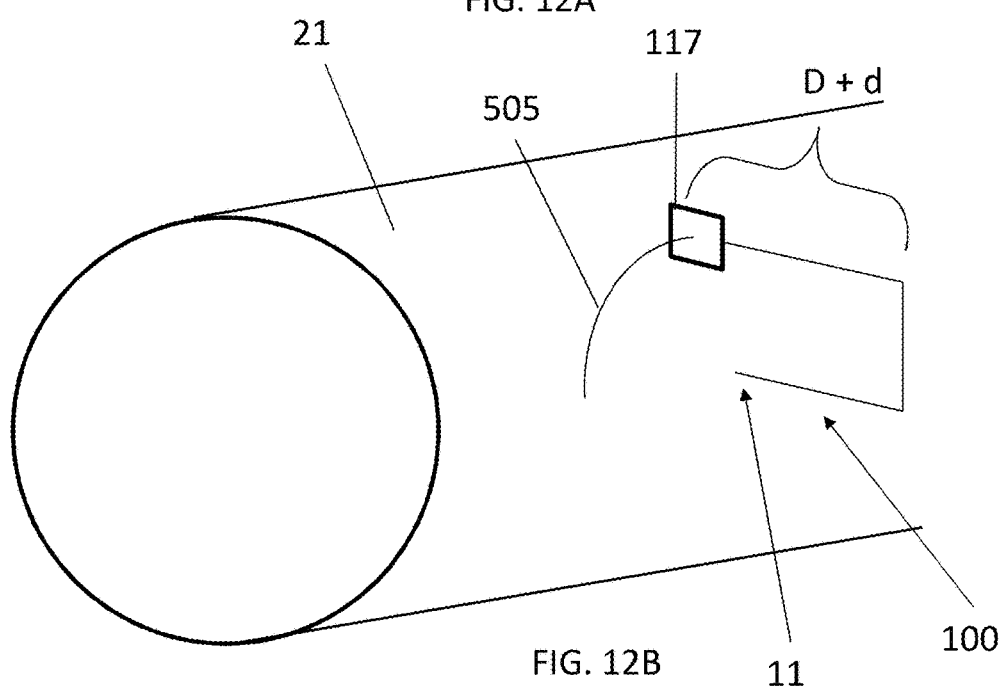
Figure 12C:
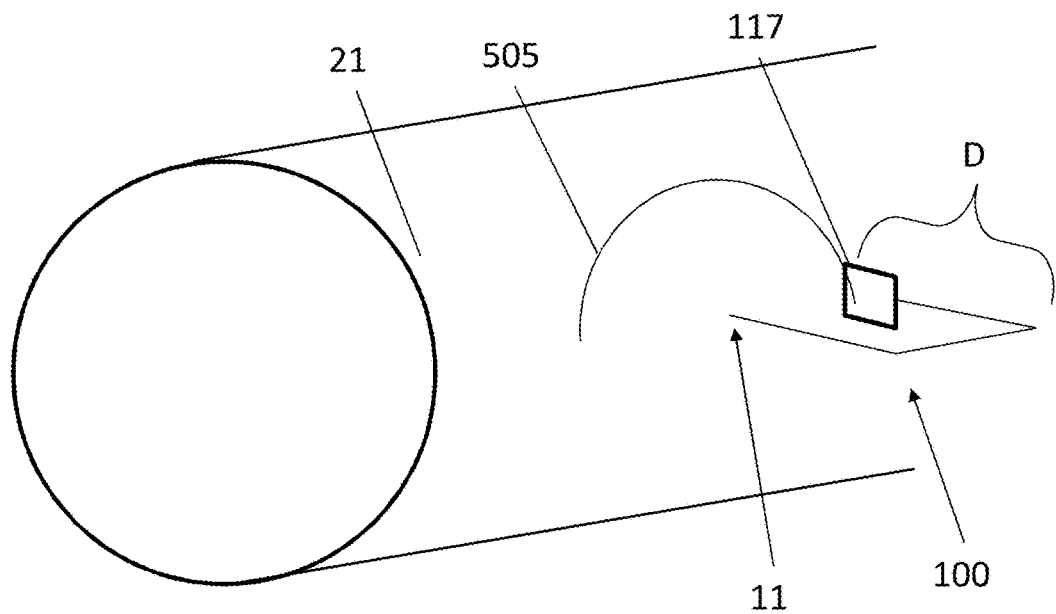
Figure 12D:
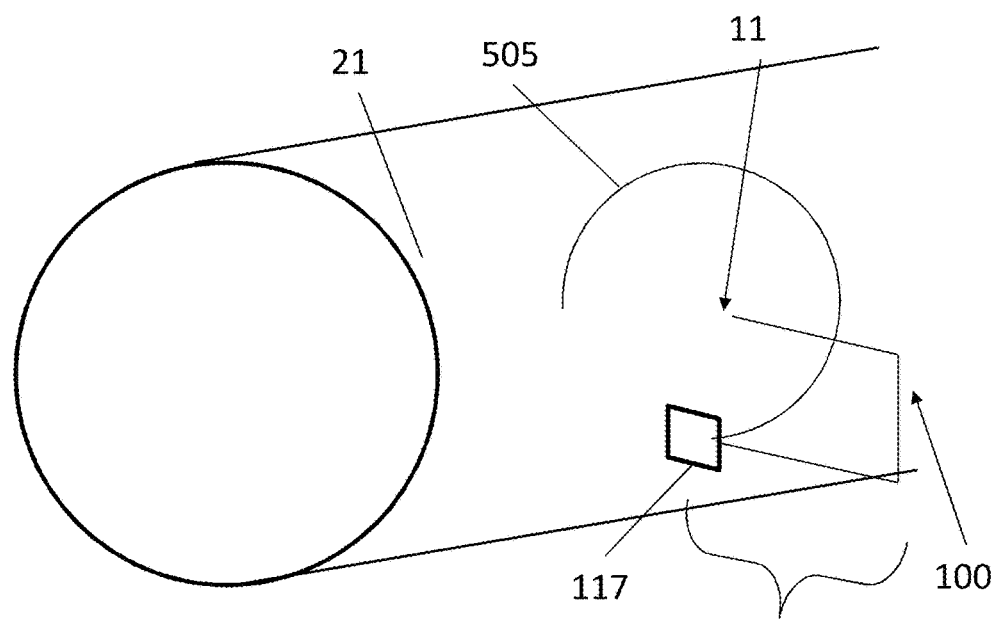

FIG. 11 shows a second method for cutting the hole 5 an upper (or ceiling) portion of the tubular structure 21. That is, as should be understood, the view of FIG. 11 schematically depicts the tubular structure 21 from above. When cutting the hole 5 in the top (or ceiling) of the tubular structure 21, in accordance with aspects of the disclosure, an operator may leave a plurality of un-cut tabs comprising a first upper tab 201 and a second upper tab 202. Compared to the side 200 tab, where the weight of the hole material 1005 removed is applied primarily in tension, in FIG. 11, the weight of the hole material 1105 to be removed is applied in shear to the first upper tab 201 and the second upper tab 202. Additionally, if only a single upper tab is retained to hold the hole material 1105 to be removed in place, that single upper tab will also be further subjected to a torque that would likely break the upper tab. While the tubular structure material (e.g., steel) may have sufficient strength to retain a hole material to be removed when in tension, the same may not be true when the hole material to be removed is subjected to shear forces (and/or torque forces). Thus, in accordance with aspects of the disclosure, when a hole material 1105 may be subject to shear or torque forces (e.g., when the hole is to be formed in a top or ceiling portion of the tubular structure), the cutting may controlled (e.g., manually or under computer control) to retain at least two tabs 201, 202.

FIGS. 12A-12D schematically depict operation of the Circular Hole Cutting Tool (CHCT). In accordance with aspects of the disclosure, as the CHCT 100 swings about a full 360°, in those regions of the tubular structure 21 where the surface is not in the same plane as the center point, the cutter 117 is operable slide (see arrows) along the torch slide rail (not shown), e.g., towards the surface as the surface recedes (due to curvature) from the center point 11, so as to maintain the cutter 117 at the proper position for forming the circular hole. In other words, the torch slide rail is operable to alter the position of the cutter 117 to maintain the cutter (or the cutter height roller 119), in contact with the tubular structure (e.g., from between a distance D to a distance D+d) as the CHCT 100 swings about a full 360°. For example, as the CHCT 100 swings from the orientation shown in FIG. 12A to the orientation shown in FIG. 12B, the cutter 117 is operable slide (see arrow) along the torch slide rail (not shown) a distance d towards the tubular structure 21 so as to maintain the cutter 117 at the proper position for forming the circular hole. Additionally, for example, as the CHCT 100 swings from the orientation shown in FIG. 12B to the orientation shown in FIG. 12C, the cutter 117 is operable slide (see arrow) along the torch slide rail (not shown) a distance d in a direction away from the tubular structure 21 so as to maintain the cutter 117 at the proper position for forming the circular hole. As the CHCT 100 swings from the orientation shown in FIG. 12C to the orientation shown in FIG. 12D, the cutter 117 is operable slide (see arrow) along the torch slide rail (not shown) a distance d towards the tubular structure 21 so as to maintain the cutter 117 at the proper position for forming the circular hole. As the CHCT 100 swings from the orientation shown in FIG. 12D to the orientation shown in FIG. 12A, the cutter 117 is operable slide along the torch slide rail (not shown) a distance d in a direction away from the tubular structure 21 so as to maintain the cutter 117 at the proper position for forming the circular hole.

Figure 13:
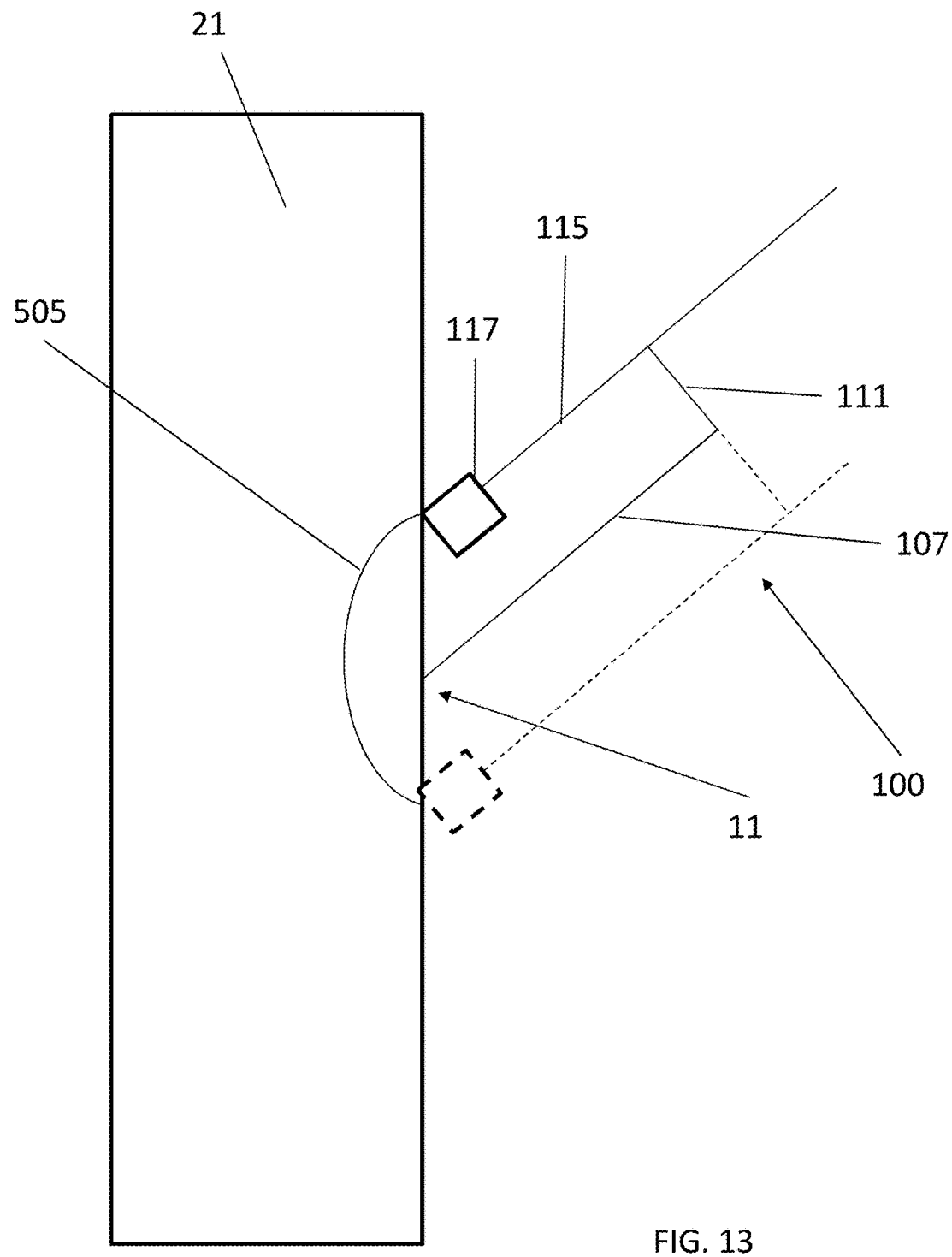
FIG. 13 schematically depicts a CHCT arranged and configured to form a hole in the tubular structure, wherein the axis of the formed hole is not normal (or perpendicular) to the surface of the tubular structure in accordance with aspects of the disclosure.

FIG. 13 schematically depicts a CHCT arranged and configured to form a hole in the tubular structure, wherein the axis of the formed hole is not normal (or perpendicular) to the surface of the tubular structure in accordance with aspects of the disclosure. As shown in FIG. 13, elements of the CHCT 100 (e.g., the cutter 117, the diameter adjustment bar 111, and the slide rail 115) schematically shown in solid lines in one position, and are also depicted dashed lines in a second position. As shown in the hidden lines, the amount of extension of the slide rail 115 when the CHCT 100 is in this position is greater than the amount of extension of the slide rail 115 when the CHCT 100 is in position depicted in solid lines. With such an embodiment, the threaded shaft 117 may be mounted on the tubular structure using, e.g., a small threaded hole formed in the tubular structure 21 at the desired non-normal orientation and/or may use a modified curved base plate configured for the desired non-normal orientation.

As shown in FIG. 13, the extent or range of movement of the cutter 117 (e.g., the extent or range of movement of the cutter with the torch slide rail 115 along the slide mount 635) should be sufficient for the necessary extension of slide rail 115 so that the cutter is properly positionable as the CHCT 100 is rotated through 360°. When forming a hole having a longitudinal axis perpendicular to the tubular structure surface (as described above), the plasma cutter retracts to a same extent on both sides of the formed hole (where the formed cut intersects a line parallel to the longitudinal axis of the tubular structure that passes through the center point 11). In contrast, as shown in the embodiment of FIG. 13, the amount of retraction of the plasma cutter is different on opposite sides of the cut (e.g., where the formed cut intersects a line parallel to the longitudinal axis of the tubular structure that passes through the center point). Thus, when forming a hole having a longitudinal axis non-perpendicular to the tubular structure surface, the cutter should be configured to retract to different extents on both sides of the formed hole (where the formed cut intersects a line parallel to the longitudinal axis of the tubular structure that passes through the center point) and to a sufficient amount to maintain the proper positioning of the cutter 117.

While embodiments of the disclosure discuss tubular structures of steel, the disclosure contemplates the CHCT may be utilized with different tubular structure materials, including, for example, other metals, such as aluminum, composite materials, plastics, concrete, and combinations thereof. Additionally, while embodiments of the disclosure described the cutter as being a plasma cutter, the disclosure contemplates other types of cutters, including lasers, water cutters, saws, etc.

While the disclosure discusses forming holes on curved surfaces of a tubular structure, it should be understood that the CHCT 100 may also be used to cut holes in flat (or planar) surfaces. Additionally, the CHCT 100 is also operable to cut holes in other curved surface shapes, for example, corrugated surface shapes, amongst other contemplated curved shapes.

In embodiments, the removed material (e.g., the portion of the tubular structure) may be used as a cover for the hole. For example, when the hole is formed to create an access port, the disclosure contemplates utilizing the removed material as an element of a cover for the access port.

While the disclosure discusses the CHCT in the context of a transportation system in a low-pressure environment, it should be understood that the CHCT may be used in any technology or field in which pipes may be connected to additional branch pipes or other conduits, for example, for water pipes, main or relief pipes.

It should be understood that, in embodiments, the CHCT 100 may be sized and scaled (e.g., upwardly and/or downwardly) as necessary in dependence upon, for example, the size of the tubular structure and/or the size of the desired hole. In other words, the CHCT 100 may be configured and/or structured (e.g., via scaling upwardly and/or downwardly) to form holes in smaller pipes, such as plumbing pipes within a home, and holes in large pipes, such as water mains. In embodiments, the size (or diameter) of the formed hole may be as small as desired, and should be less than the diameter of the tubular structure.

While embodiments have described the CHCT 100 as being manually controlled, e.g., using human observation, the disclosure contemplates that, in some embodiments, the CHCT 100 may utilize one or more sensors (e.g., cameras, proximity sensors, CCDs, temperature sensors) to provide additional feedback for controlling operation of the CHCT 100. For example, a camera may be mounted to the CHCT 100 to provide a user (e.g., via a video monitor) with real-time information regarding a cut in progress. In further contemplated embodiments, the CHCT 100 may utilize the one or more sensors in combination with a computer processor to control operation of the motor so as to control the rotation rate of the CHCT 100.

System Environment

Aspects of embodiments of the present disclosure (e.g., control systems for a CHCT 100) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 14:
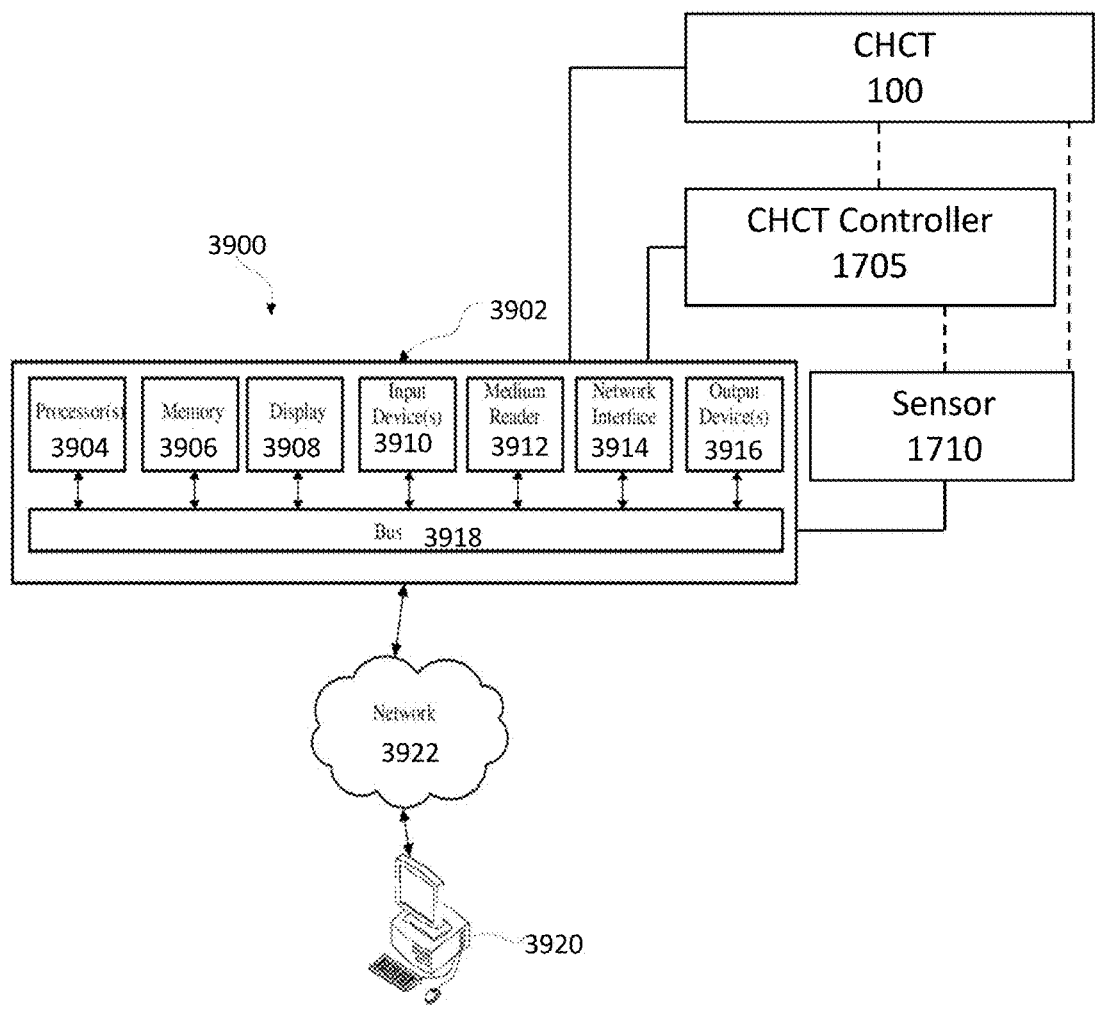
FIG. 14 is an exemplary system for use in accordance with the embodiments described herein.

FIG. 14 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 14, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 14, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof.

In accordance with aspects of the disclosure, the system 3900 may also include a CHCT controller 1405 in communication with the computer system 3902. As shown in FIG. 14, the CHCT controller 1405 is in communication with at least one CHCT 100. As also shown in FIG. 14, the CHCT controller 1405 is in communication with at least one sensor (e.g., a camera, load sensor, speed sensor, etc.).

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 14. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the disclosure are not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed is:

1. A hole cutting apparatus for cutting a hole in a tubular structure, comprising:
   a center shaft;
   a slide mount rotatably attached to the center shaft;
   a slide rail slidably attached to the slide mount;
   a cutter attachable to the slide rail so as to move with the slide rail;
   a cutter height roller attached to the cutter; and
   a base plate arrangeable on the cutting surface of the tubular structure, wherein the base plate is structured and arranged to support the center shaft, and
   wherein the cutter height roller is structured and arranged to maintain the cutter at a distance from a cutting surface of the tubular structure as the hole is cut.

2. The hole cutting apparatus of claim 1, wherein the slide rail is slidable in a direction parallel to the longitudinal axis of the center shaft.

3. The hole cutting apparatus of claim 1, further comprising a support cylinder fastened to the base plate wherein the support cylinder accommodates a portion of the center shaft to support the center shaft.

4. The hole cutting apparatus of claim 1, wherein the base plate has tubular-structure contact side, and wherein the tubular-structure contact side has a curved surface approximating an outer diameter of the tubular structure.

5. The hole cutting apparatus of claim 1, further comprising:
   a diameter adjustment coupler pivotably attached around the center shaft;
   a diameter adjustment bar adjustably fastenable to the diameter adjustment coupler so as to set a radius of the hole; and
   a slide base attached to a distal end of the diameter adjustment bar and structured and arranged to securely fasten the slide mount thereto.

6. The cutting apparatus of claim 5, further comprising an extension bar attached to an end of the diameter adjustment bar opposite the slide base, and structured and arranged to provide a handle for actuating manual rotation of the diameter adjustment bar around the center shaft.

7. The hole cutting apparatus of claim 1, further comprising at least one tensioning spring connected between the slide mount and the slide rail so as to bias the slide rail towards the cutting surface.

8. The hole cutting apparatus of claim 1, wherein the cutter is a plasma cutter.

9. The cutting apparatus of claim 1, further comprising:
   a motor;
   a sprocket attached to rotate with the slide mount; and
   a chain attached between the motor and the sprocket,
   wherein the motor is structured and arranged to provide a rotational force to rotate the slide mount about the center shaft.

10. The cutting apparatus of claim 1, further comprising:
a plurality of couplers attached to the slide rail and structured and arranged to securely accommodate the cutter therein, so as to releasably fasten the cutter to the slide rail.

11. The cutting apparatus of claim 5, further comprising:
a lower flange insertable into a lower side of the diameter adjustment coupler;
an upper flange insertable into an upper side of the diameter adjustment coupler;
wherein the center shaft passes through the lower flange, the diameter adjustment coupler, and the upper flange.

12. The cutting apparatus of claim 1, wherein the central shaft has a first threaded end and a second threaded end, and wherein the first threaded end is configured for threaded engagement with a center point hole formed in the tubular structure.

13. The cutting apparatus of claim 12, further comprising a nut structured and arranged for threaded engagement with the second threaded end of the central shaft, wherein the nut secures a diameter adjustment coupler arranged on the central shaft.

14. A method for cutting a hole in a tubular structure, the method comprising:
attaching the hole cutting tool of claim 1 to the tubular structure;
activating the cutter;
rotating the cutter about the center shaft to cut the tubular structure to form the hole; and
maintaining the cutter at the distance from a cutting surface of the tubular structure with the cutter height roller as the hole is cut.

\* \* \* \* \*